United States Patent [19]

Cohen

[11] Patent Number: 5,291,382
[45] Date of Patent: Mar. 1, 1994

[54] PULSE WIDTH MODULATED DC/DC CONVERTER WITH REDUCED RIPPLE CURRENT COPONENT STRESS AND ZERO VOLTAGE SWITCHING CAPABILITY

[75] Inventor: Isaac Cohen, Dix Hills, N.Y.

[73] Assignee: Lambda Electronics Inc., Melville, N.Y.

[21] Appl. No.: 817,929

[22] Filed: Jan. 6, 1992

Related U.S. Application Data

[63] Continuation-in-part of Ser. No. 683,323, Apr. 10, 1991, abandoned.

[51] Int. Cl.$^5$ .............................................. H02M 3/335
[52] U.S. Cl. .......................................... 363/16; 363/20; 363/56; 363/131
[58] Field of Search ........................ 363/18, 19, 20, 21, 363/97, 131, 56, 16; H02M 3/335

[56] References Cited

U.S. PATENT DOCUMENTS

| | | | |
|---|---|---|---|
| 4,618,919 | 10/1986 | Martin Jr. | 363/21 |
| 4,809,148 | 2/1989 | Barn | 363/131 X |
| 4,899,271 | 2/1990 | Seierson | 363/126 |
| 4,959,764 | 9/1990 | Bassett | 363/16 |
| 4,975,821 | 12/1990 | Lethellier | 363/21 |
| 5,111,372 | 5/1992 | Kameyama et al. | |

FOREIGN PATENT DOCUMENTS 0289196 11/1988 PCT Int'l Appl.
WO08347 2/1989 PCT Int'l Appl.
290906 4/1907 U.S.S.R.

OTHER PUBLICATIONS

EPO European Search Report Annex To the European Search Report on EP Appln. 92302818.7.
Excerpt from the book *Applied Electronics, A First Course in Electronics, ELectron Tubes and Associated Circuits*, by members of the staff of Massachusetts Institute of Technology, p. 323, Fig. 4 (John Wiley & Sons, Inc.).
Excerpt from a book by Dawes, pp. 568–569 (1934).
Excerpt from a book, *Vacuum Tubes*, by Eastman, pp. 212–213 (1938).

*Primary Examiner*—Emanuel T. Voeltz
*Attorney, Agent, or Firm*—Morgan & Finnegan

[57] ABSTRACT

An improved DC to DC converter is provided in particular for converters with high power density requirements. The converter comprises an input voltage source and a capacitor connected in series to the voltage source. A switching transistor configuration connects the voltage source and the capacitor alternatively to the primary windings of a transformer. The secondary windings of the transformer are connected to a full-wave rectifier and a filter. The output voltage provided at the output of the filter is modulated by a controlling means.

11 Claims, 8 Drawing Sheets

Fig. 4a
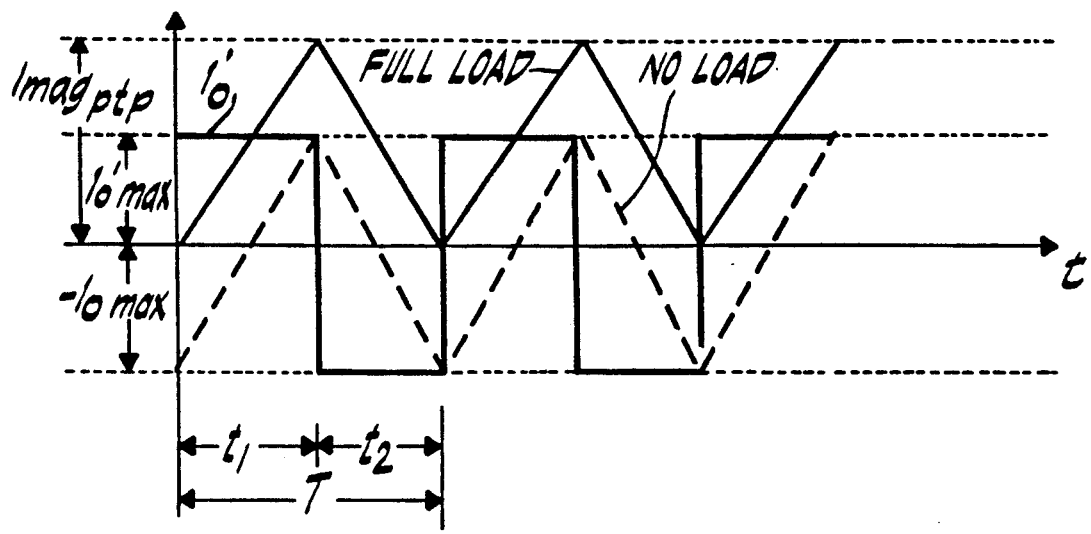
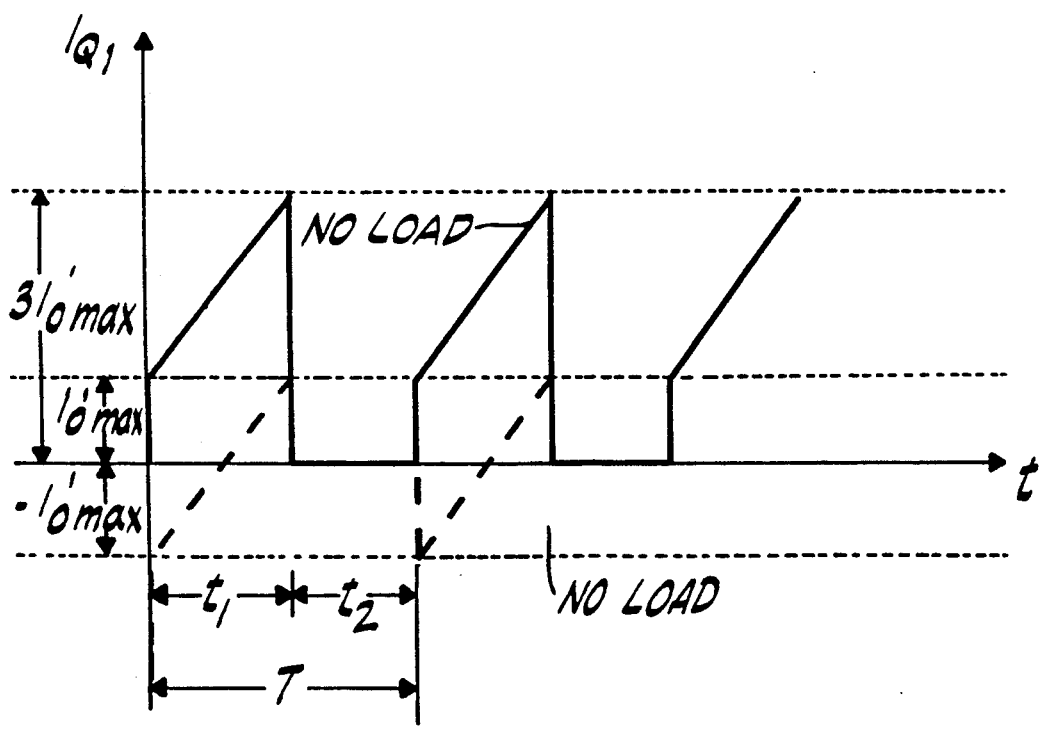
Fig. 4b

PULSE WIDTH MODULATED DC/DC CONVERTER WITH REDUCED RIPPLE CURRENT COPONENT STRESS AND ZERO VOLTAGE SWITCHING CAPABILITY

This is a continuation-in-part of co-pending application Ser. No. 07/683,323, filed on Apr. 10, 1991.

BACKGROUND

1. Field of Invention

This invention applies to the field of DC to DC power conversion and in particular to converters required to provide high power density.

2. Prior Art

A vast variety of topologies have been invented over the years with the purpose of improving power density of power converters. Some of these topologies provide means to reduce or to eliminate switching losses in order to allow increased frequency of operation, increased efficiency, reduced size and weight. Typical of this approach is the technique disclosed in U.S. Pat. No. 4,415,959, issued to P. Vinciarelli, for "Forward Converter Switching at Zero Current" which reduces the size of the energy storage components.

Another approach is disclosed by U.S. Pat. No. 4,618,919, issued to Hubert C. Martin, Jr., for "Topology for Miniature Power Supply with Low Voltage and Low Ripple Requirements". This patent combines two single ended (flyback) converters to increase effective ripple frequency and reduce the size of energy storage components.

Another approach is to maximize the energy of switching devices and the transformer in order to improve the power transfer characteristics of the converter as indicated in U.S. Pat. No. 4,441,146 issued to P. Vinciarelli for "Optimal resetting of the transformer's core in single ended forward converters" and in U.S. Pat. No. 4,809,148 issued to Barn for "Full-fluxed, single ended DC converter".

Finally, in an article published in the PCIM magazine, January 1991, p. 8, "New PWM Topology features zero- voltage switching and constant switching frequency", and also disclosed in U.S. Pat. No. 4,959,764, John A. Bassett proposes a topology that offers both the improved utilization of components and lossless switching, thereby allowing efficient operation at high frequency. While each of the above disclosures addresses some facets of the power conversion issue, none provides an approach achieving all of the advantages discussed above.

SUMMARY OF THE INVENTION

This invention introduces a topology featuring the following characteristics:

Low voltage stresses on both switching devices and output rectifiers.

Low ripple voltage.

Inherent capability of operating with zero voltage switching.

Optimal utilization of the magnetic materials used in the circuit.

All of the above principal characteristics are achieved by merging a bidirectional buck boost converter and a double ended, buck derived converter in a single power conversion structure.

BRIEF DESCRIPTION OF THE DRAWINGS

FIG. 1b represents the wave diagrams of various components of FIG. 1a.

FIG. 2b represents the wave diagrams of various components in FIG. 2a.

FIG. 4a is a wave diagram of magnetizing currents for full load and no load conditions in FIG. 3b.

FIGS. 4b and 4c depict the wave forms of switching transistor currents in FIG. 3b.

DESCRIPTION OF THE PREFERRED EMBODIMENTS

Figure 1A:
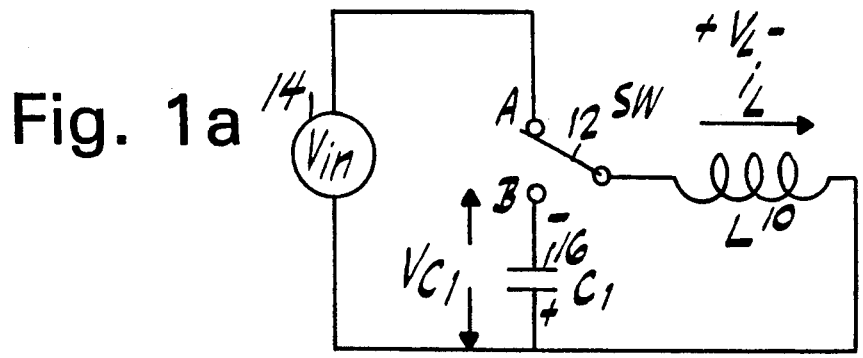
FIG. 1a is a simplified circuit diagram illustrating features of one embodiment of the present invention.

In the preferred embodiment of FIG. 1a, a voltage source 14 supplies a voltage Vin to a flyback converter formed by a toggle switching device 12, a capacitor 16 of value $C_1$, and an inductor 10 of value L.

Switch 12 is assumed to be in position A for a time interval $t_1$, then instantaneously moves to position B for a time interval $t_2$. The process is repeated indefinitely with a period T given by:

$$T = t_1 + t_2 \tag{1}$$

Duty cycle D is defined as:

$$D = t_1/T \tag{2}$$

This action of switch 12 connects inductor 10 alternatively across the input voltage source 14 and cross capacitor 16. Assuming that capacitor 16 has a value large enough such that the variation of the voltage $V_{c1}$ across capacitor 16 during a time interval T is negligible, its steady state value must satisfy the volt-second balance across inductor 10:

$$Vin \cdot t_1 = V_{c1} t_2 \tag{3}$$

$$V_{c1} = Vin \cdot \frac{t_1}{t_2} \tag{4}$$

By substituting (1) and (2) into (4) we get:

$$V_{c1} = Vin \frac{D}{1-D} \quad (5)$$

This is the familiar DC transfer function of the buck boost (flyback) converter. The important characteristic of this flyback converter is that due to the bidirectional nature of the switch 12, energy can flow from either voltage source 14 to capacitor 16 or vice versa during either position of the switch.

Figure 1B:
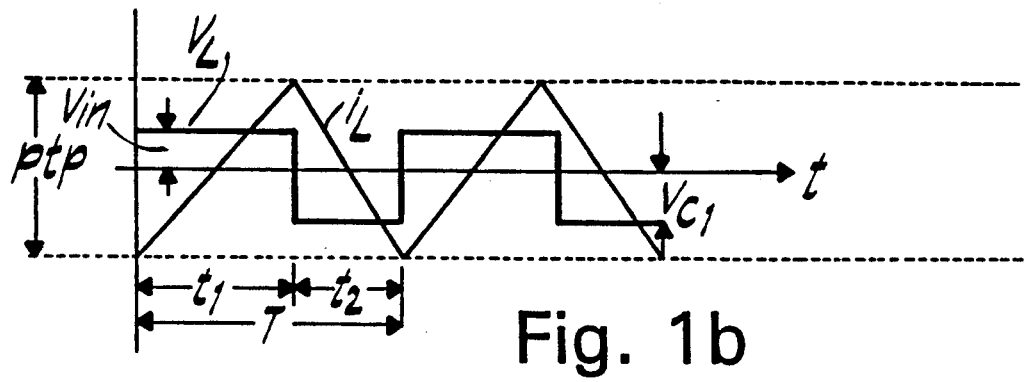

This is illustrated in FIG. 1b, wherein the current flowing through inductor 10 is triangular and has zero average value, and the voltage across it is a square wave with a positive value $V_{in}$ and a negative value $Vc_1$.

Referring now to FIG. 2, a bridge rectifier 20 and a filter formed by inductor 22 with a value $L_f$ and capacitor 24 with a value $C_f$ are now connected across the inductor 10, with a resistor 26 loading the filter's output. The average output voltage Vo appearing across the load 26 is given by:

$$V_o = Vin \cdot D + Vin \frac{D}{1-D} \cdot (1-D) \quad (6)$$

or,
$$V_o = 2VinD \quad (7)$$

The circuit of Figure (2) is illustrative of a principal feature of the invention while equation (7) shows its DC transfer characteristic, i.e., the value of its output voltage as a function of the input voltage and the operating duty cycle.

Switch 12, in addition to driving the bidirectional flyback converter, also operates as a double ended converter in conjunction with the circuit connected in parallel to inductor 10, generating the output voltage given by equation (7). The introduction of the loading circuit of FIG. 2a which includes the full wave rectifier 20, filter inductor and capacitor 22 and 24 and load resistor 26, alters the current in the flyback inductor 10 as discussed below.

Assuming that the filter inductor 10 is large enough such that its current $i_L$ is ripple free, during interval $t_2$ this current will be extracted from capacitor 16. Consequently, the volt-second balance constraint on flyback inductor 10 will cause a DC current level buildup in it, thereby maintaining the voltage on capacitor 16 at the value given by equation (5). The current in inductor 10 under intermediate load and under full load is shown in FIG. 2b. As is shown later, the situation where $\Delta I_{LPTP}$ has twice the value of the output current Io is of particular significance for zero voltage switching operation. Although the circuit of FIG. 2a can be used as is, circuit configurations where the output voltage is isolated from the input circuit or at least is referred to the same ground find more applications.

Figure 3A:
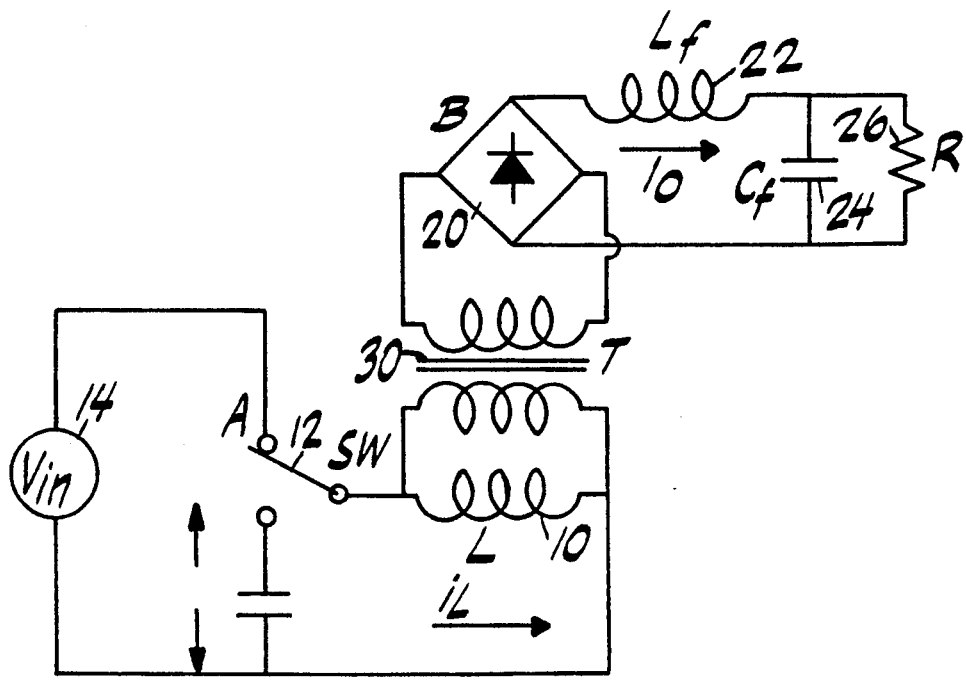
FIG. 3a is a circuit diagram illustrating features of still another embodiment of the present invention.

One such circuit shown in FIG. 3a can be obtained by using an isolation transformer 30 to connect the rectifier bridge 20, the filter 22-24, and the load 26 across the flyback inductor 10.

At this point, a significant simplification may be obtained by eliminating inductor 10 and replacing it with the magnetizing inductance of the primary winding 32 of transformer 30, after gapping its core or using a core material capable of supporting the DC flux resulting from the DC current buildup mentioned before It will be evident to those versed in the art that depending on the application, transformer 30 may be configured as an autotransformer and can have a center-tapped secondary or a multitude of secondaries if more than one output voltage is desired.

Figure 3B:
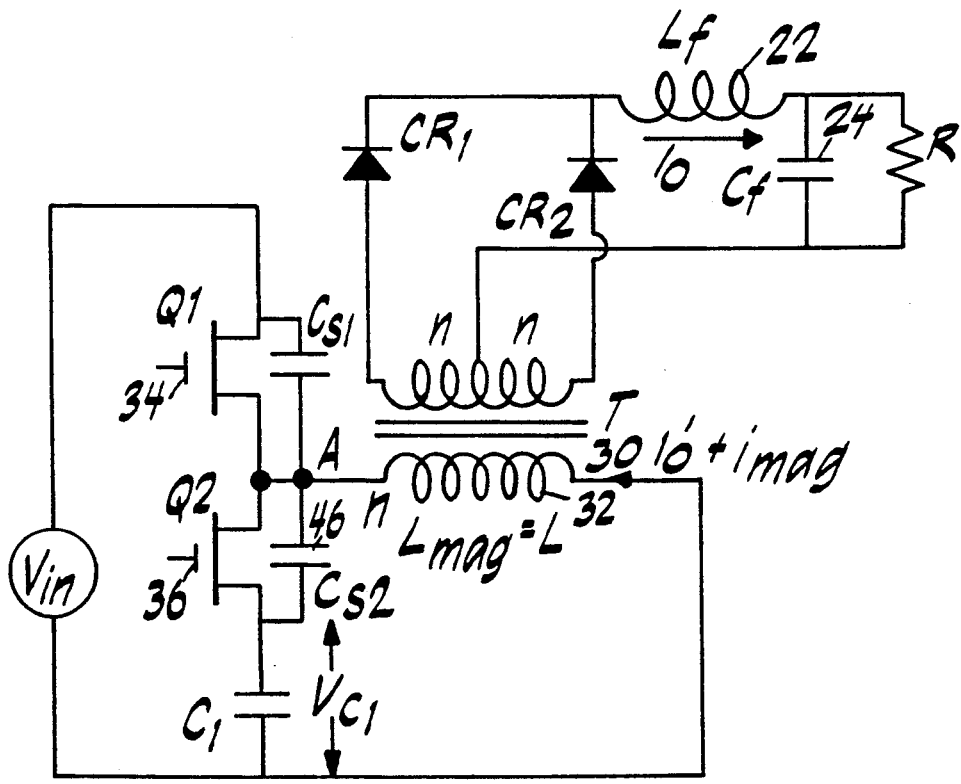
FIG. 3b is a circuit diagram of still another embodiment of the present invention.

In order to contrast the advantages of this invention with the prior art, the preferred embodiment of FIG. 3b can be compared to prior art circuits like the one disclosed in U.S. Pat. 4,441,146. In FIG. 3b, the toggle switch is realized using two MOS transistors 34 and 36, driven by two complementary signals so that when transistor 34 is on, transistor 36 is off and vice versa. Also, in order to avoid cross conduction, a short delay time is provided between the turn-off of one transistor and the turn-on of the next. This delay will have no impact on the operation as described above, since when transistor 34 is turned off, the current of the flyback inductor (now the shunt inductance of transformer 30) will free wheel through the body diode of 36 and vice versa.

Figure 3C:
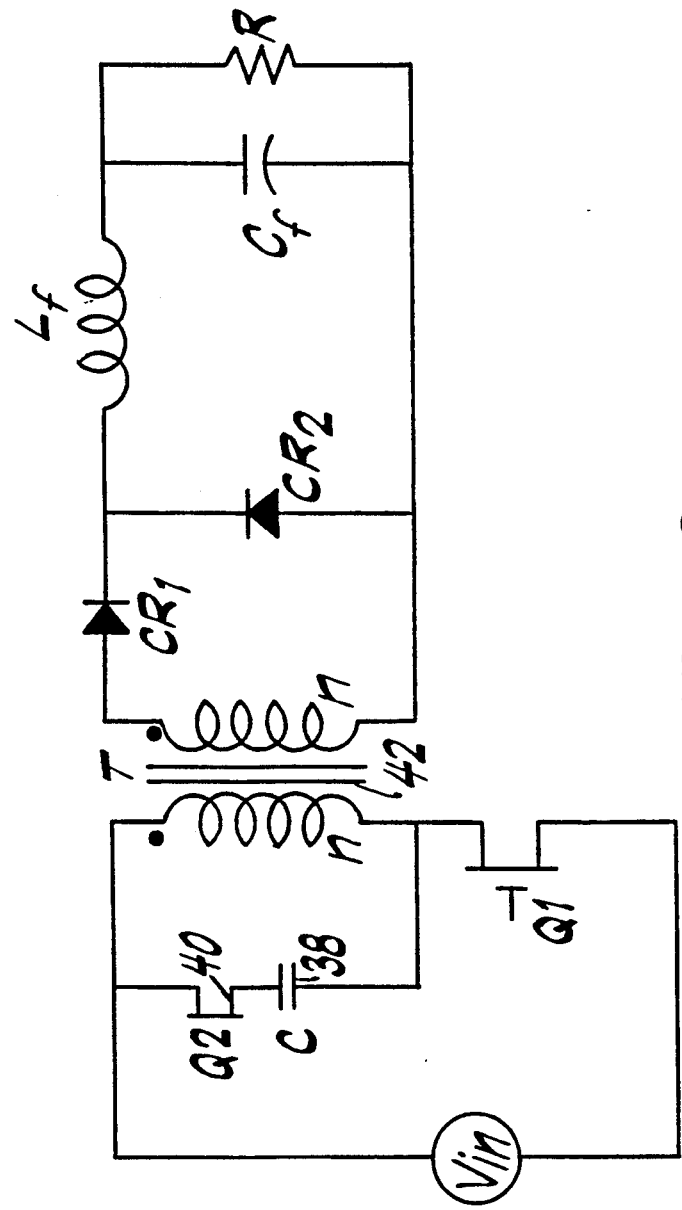
FIG. 3c is a circuit configuration of a prior art topology.

For reference purposes, the circuit shown in U.S. Pat. No. 4,441,146 at FIG. 4e is shown herein in FIG. 3c, this being one of several possible embodiments. The components 38 and 40 form a "magnetizing current mirror" that resets the core of the transformer. In this case, the magnetizing inductance of the transformer 42 is fulfilling no useful purpose. Presumably the magnetizing inductance is kept at the highest value possible in order to minimize magnetizing current and, as opposed to the circuit of the present invention, eliminates any DC component from the core flux at any operating condition. Otherwise, the circuit is a single ended forward converter, with an output voltage given as:

$$Vo = Vin.D \quad (8)$$

Equation (8) assumes unity turns ratio for transformer 42.

Assuming that the converter is designed to operate over an input voltage range $Vin_{(min)}$ to $Vin_{(max)}$, corresponding to a duty cycle range $D_{max}$ to $D_{min}$, the ripple voltage appearing across the filter inductor will have a maximum peak to peak value of:

$$V_{ptp(FMD)} = Vin_{max} \quad (9)$$

In the converter of the present invention illustrated in FIG. 3b, the peak-to-peak ripple will be the difference between the secondary voltage during the conduction of transistor 34 and the secondary voltage during the conduction of transistor 36. Assuming the same input voltage range and same output voltage, the transformer turns ratio has to be 0.5 (ref. eq. 7). The peak-to-peak voltage will therefore be:

$$V_{ptp(NEW)} = 0.5 \left( Vin - \frac{VinD}{1-D} \right) \quad (10)$$

or $$V_{ptp(new)} = \frac{0.5 Vin(1-2D)}{1-D} \quad (11)$$

As we can see, the value of the voltage is a function of the duty cycle and it nulls at D=0.5. Furthermore, assuming a practical range of D of 0.35 to 0.7 (an input voltage range of 2:1) the maximum peak to peak voltage will occur at the highest input voltage and will have the value:

$$V_{ptp(new)} = 0.5 \cdot Vin_{max} \frac{1 - 0.7}{1 - 0.35} = 0.2308 Vin \qquad (12)$$

This value represents an improvement of a factor of $V_{ptp(FWD)}/V_{ptp(NEW)}$=4.33. The significance of this result is that the filter inductor can be reduced by a factor of 4.33 in the circuit of the present invention for the same value of peak-to-peak ripple current in the output circuit as compared to a forward converter operating over the same range of input voltage and duty cycles.

Further examination of the circuit of the present invention reveals an additional important property. By connecting capacitor 44 with a value of $C_{S1}$ and capacitor 46 with a value of $C_{S2}$ across transistors 34 and 36, it is possible to delay the rise of the voltage across the switches at turn-off until the current in the switch reaches zero, thereby virtually eliminating turn-off losses.

Furthermore, by delaying the turn-on of the transistors until the load current is clamped by the body diodes (or diodes connected in parallel to the switches in case devices other then MOSFETS are used), the capacitors across the devices are charged/discharged by the load current, thereby eliminating the turn on losses of the switches.

In order to achieve these operating conditions, some constraints must be imposed on the circuit's elements.

For one optimized performance, the following constraints apply:

$$I_{Lptp} = I_{magptp} = \frac{Vin_{min}D_{max} \cdot T}{L} = 2I'o_{max} \qquad (13)$$

This equation allows calculation of $L_{mag}$:

$$L_{mag} = L = \frac{Vin_{min}D_{max}T}{2I'o_{max}} \qquad (14)$$

where $I'o_{max}$ is the value of the output current reflected to the primary of the transformer 30. This constraint will bring the magnetizing current of transformer 30 to change between zero and $2I'o_{max}$ (ref. FIG. 4a) at full load and between $-Io'_{max}$ and $+Io'_{max}$ at no load.

Figure 4C:
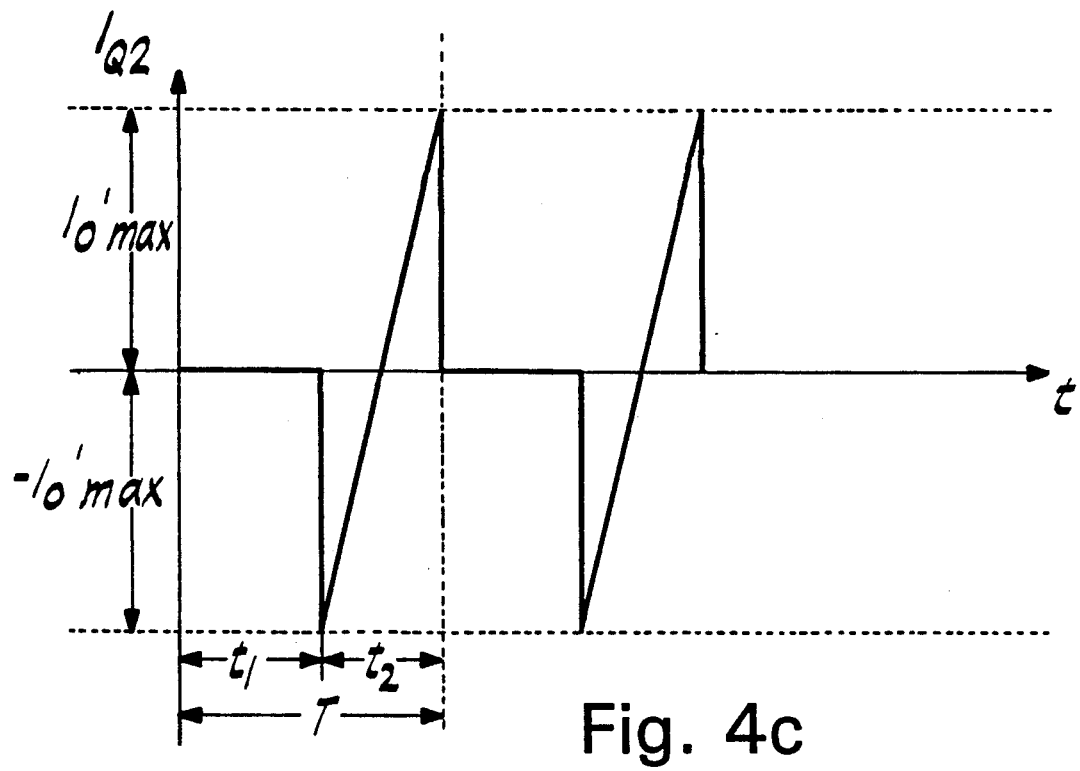

As shown in FIGS. 4b and 4c, the current in Q1, transistor 34 at the turn-off instant may vary from $I'o_{max}$ at no load to $3I'o_{max}$ at full load, while the current in Q2, transistor 36 at turn off will be always equal to $I'o_{max}$. These circuits will be available to charge/discharge capacitors 44 and 46 during the dead time intervals between the transistors conduction.

Figure 4D:
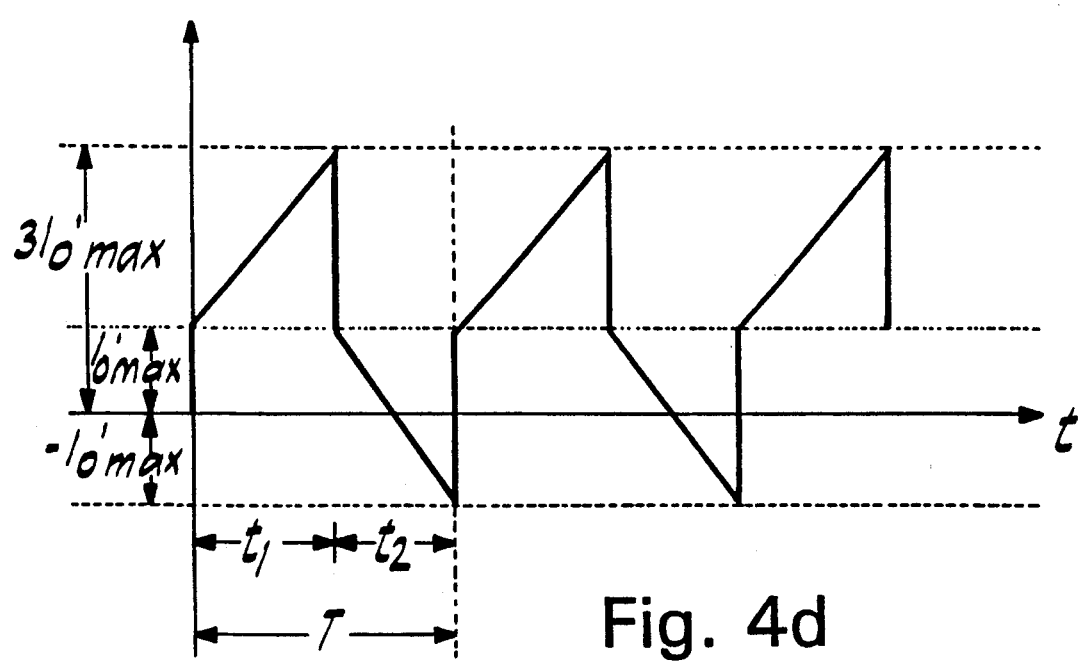
FIG. 4d is a wave diagram of the current in primary winding 32 in FIG. 3b.

FIG. 4d shows the current of the primary winding 82 of transformer 30.

Figure 5A:
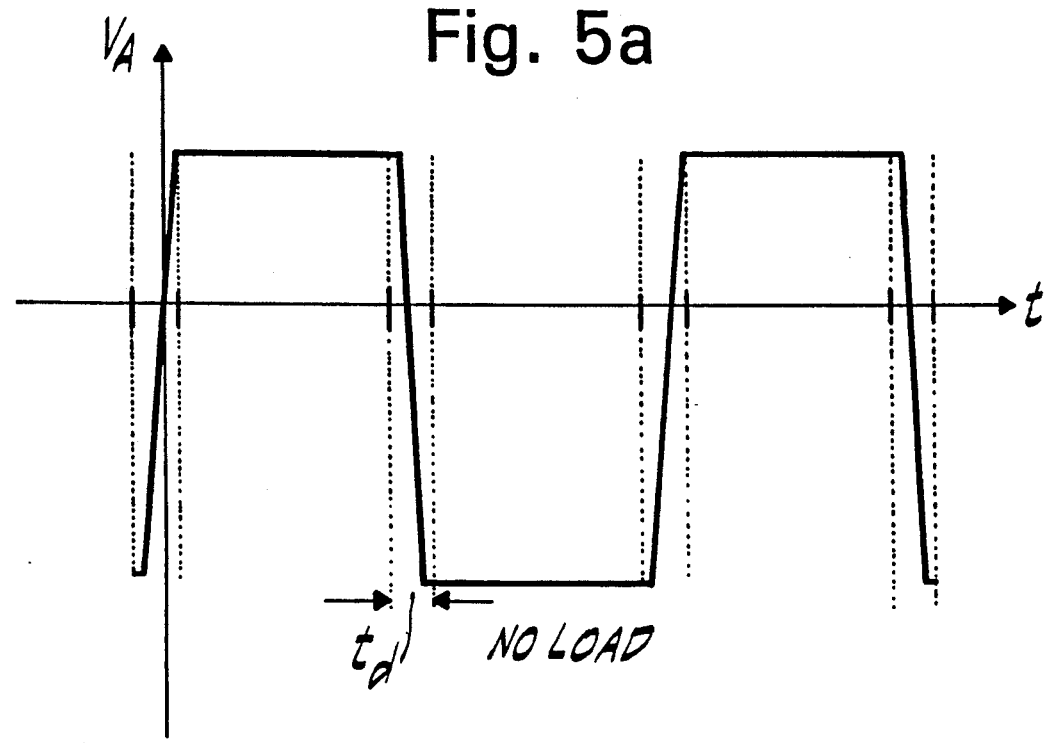
FIG. 5a is the wave diagram of point A of FIGS. 3a or 3b at no load.
Figure 5B:
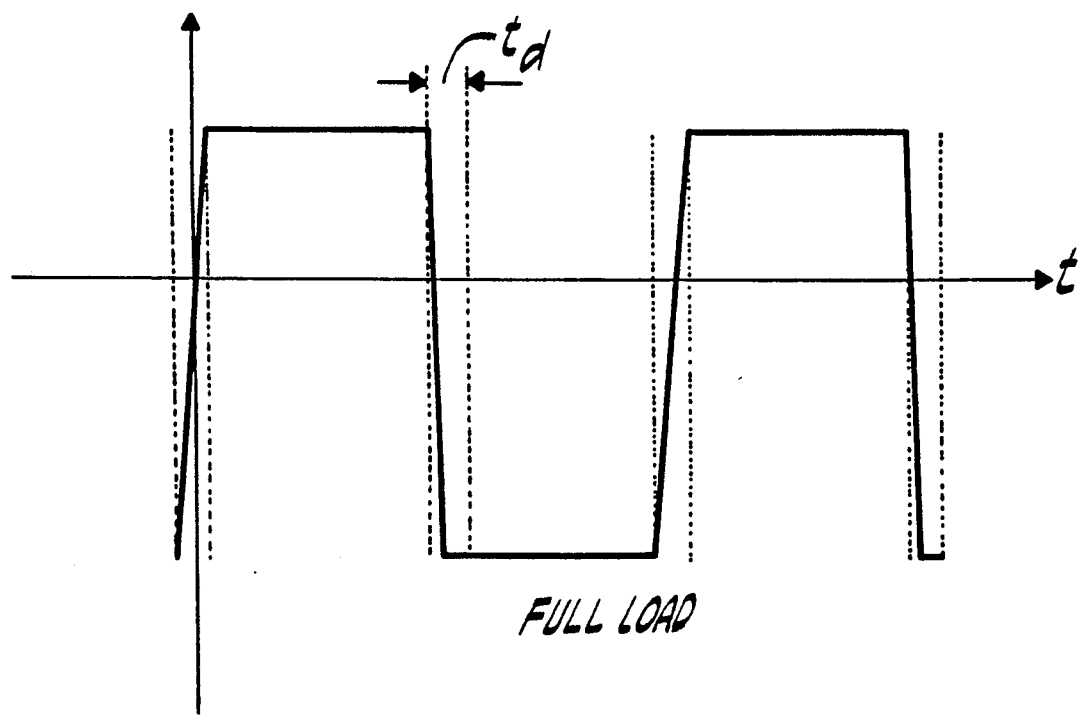
FIG. 5b is a wave diagram of point A in FIGS. 3a or 3b at full load.

FIGS. 5a and 5b show the voltage at point A of FIG. 3 at no load and full load respectively. Since the lowest currents occur at no load, guaranteeing that the primary current of the transformer can charge the capacitors at no load during the available dead time, the constraints on the values of the capacitors and the dead time are determined by the no load condition:

$$I'o_{max} \cdot t_d = (C_{S1} + C_{S2})\Delta V_{max}. \qquad (15)$$

where $t_d$ is dead time between the conduction of transistors 34 and 36 and $\Delta V_{max}$ is the maximum peak to peak value of voltage at point A of FIG. 3, the value of this voltage is given by:

$$\Delta V_{max} = \left[ Vin \left( \frac{1}{1-D} \right) \right]_{max} \qquad (16)$$

Evidently, this value depends on the range of input voltage and the maximum duty cycle.

For an input voltage range of 2 and a maximum duty cycle of 0.7, $\Delta V_{max}$ will occur at minimum input voltage and will be equal to 3.333 $Vin_{min}$.

Equation 15 allows us to choose arbitrarily either the value of the capacitors or the value of the dead time $t_d$. For instance, when operating at a high frequency it may be desirable to use the drain-to-source capacitance of the transistors themselves to obtain zero voltage switching.

By substituting the value of the capacitances in Equation 15 we can find the value of $t_d$ necessary to guarantee zero voltage switching. On some occasions the value of self-capacitance or parasitic capacitance of transistors 34 and 36 may be such that capacitors 44 and 46 are not necessary. The converter may still operate with zero switching losses using the self capacitance of transistors 34 and 36. Also, by making the peak-to-peak magnetizing current of the transformer either higher or lower than twice the reflected load current (Equation 13), we either increase the conduction losses in the switches and the primary of the transformer, or lose the zero voltage switching before reaching full load. Nevertheless, economic and other trade offs may dictate a relaxation of these constraints so only part of the potential improvement is realized.

Figure 2A:
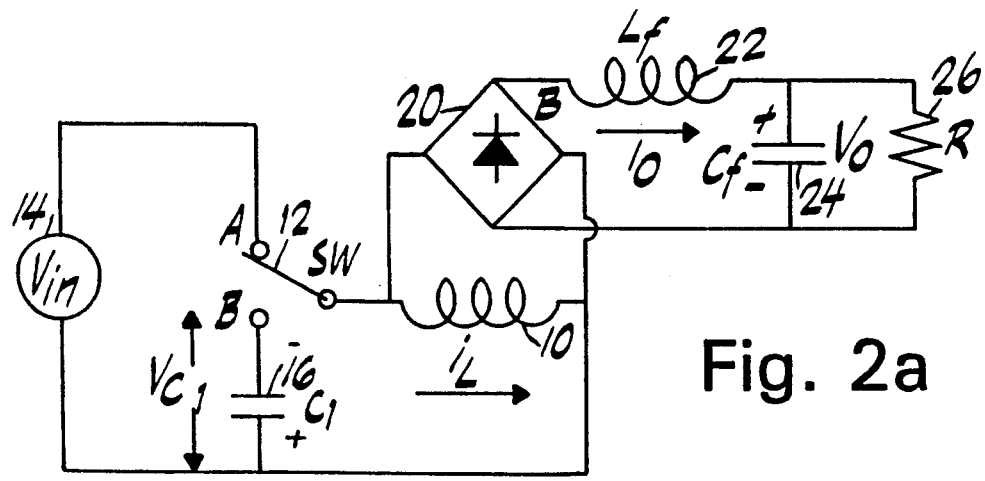
FIG. 2a is a circuit diagram illustrating features of another embodiment of the present invention.
Figure 2B:
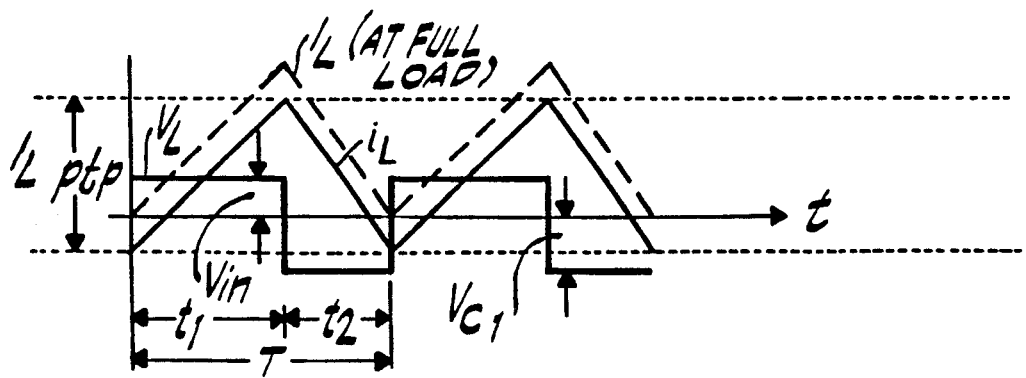
Figure 6:
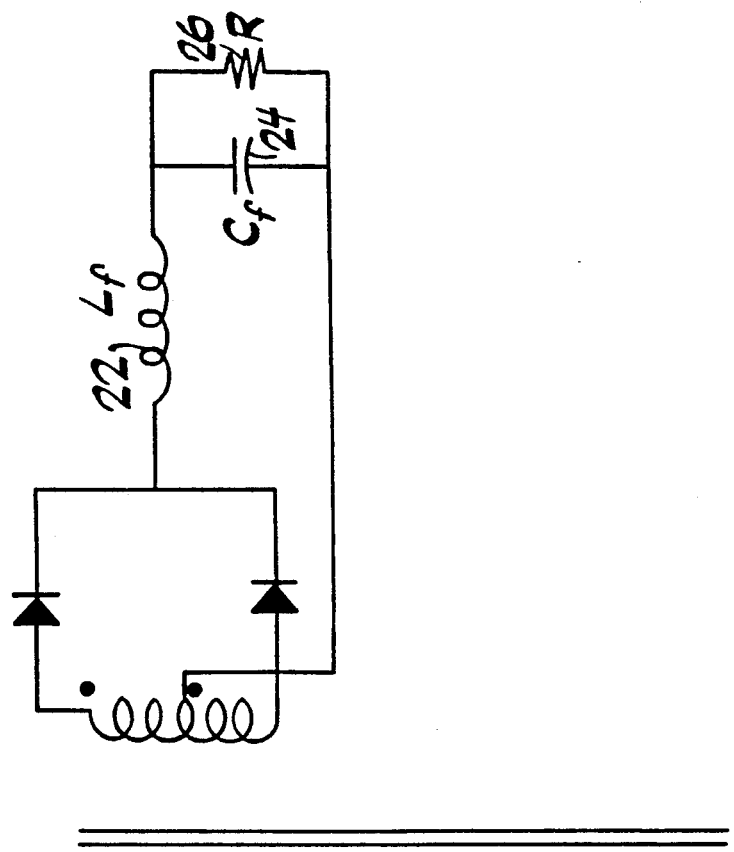
FIG. 6 is a circuit diagram which illustrates another embodiment of the present invention.
Figure 6:
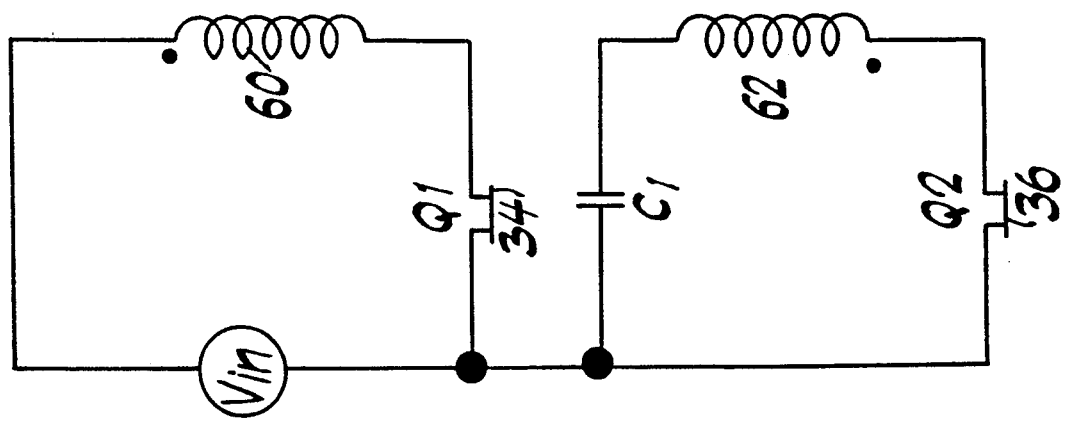

It should be understood that by applying circuit theory rules to the configurations of FIGS. 1a, 2a and 3b, those versed in the art can modify the circuits without altering its topological essence or its mode of operation. For instance, by using two primary windings 60 and 62, as shown in FIG. 6, the circuit can be modified so that both switches are referred to the same point.

Figure 7:
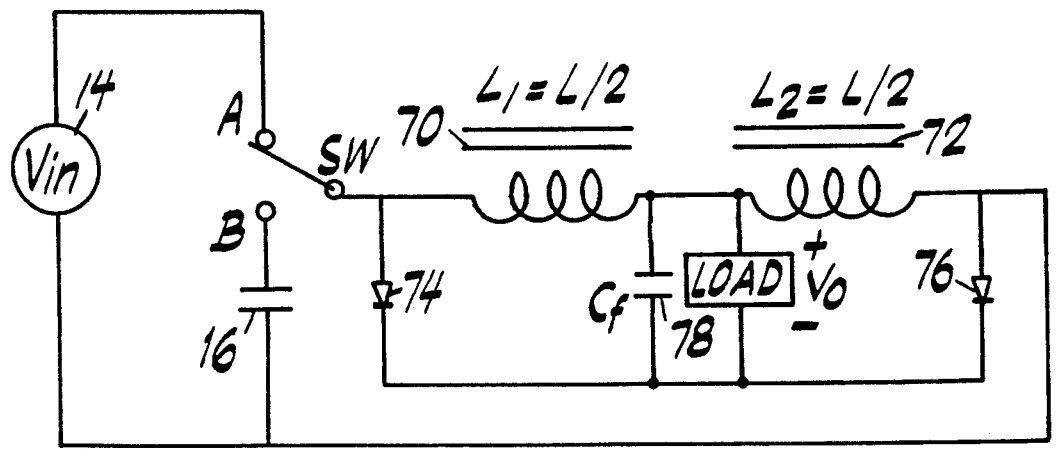
FIG. 7 is a circuit diagram illustrating another embodiment of the present invention.

FIG. 7 illustrates another embodiment of the present invention. Specifically, the output circuit includes two separate inductors 70 and 72 each having a value L/2 which is one half the value of inductor 10 of FIG. 1a. Inductors 70 and 72 are connected in series with diodes 74 and 76. A capacitor 78 is connected between the common terminal of the inductors and the common terminal of the diodes. Hence, the output circuit provides full wave rectification by using two rectifiers 74 and 76 and a capacitor 78. The output voltage across the load in FIG. 7 is only one half the value of the voltage $V_o$ obtained by the output circuit of FIG. 2a. An advantages of the output circuit of FIG. 7 is the use of only two rectifiers instead of a full bridge rectifier. Another advantage is the use of the inductors 70 and 72 as both flyback converter inductor and output filter inductors for the output voltage. The output circuit is similar to the circuit disclosed in U.S. Pat. No. 4,899,271 issued to Seiersen and incorporated herein by reference.

Figure 8:
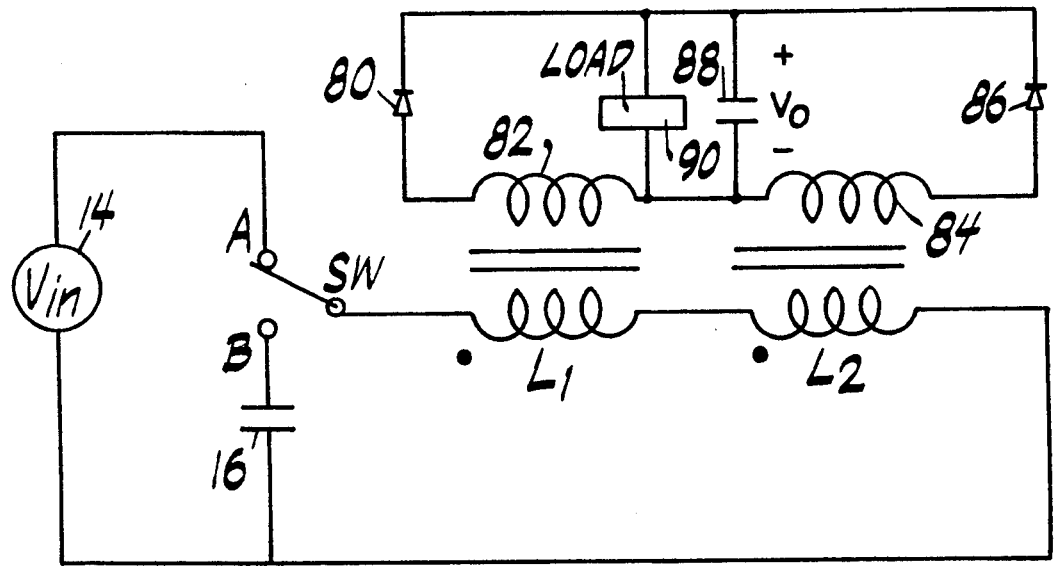
FIG. 8 is a circuit diagram illustrating still another embodiment of the present invention.

FIG. 8 illustrates another embodiment of the invention. The output circuit includes two separate inductors 82 and 84 each having a value L/2 which is one half the value of inductor 10 of FIG. 1a. Inductors 82 and 84 each have isolation windings 82a and 84a. Inductors 82 and 84 each have low magnetizing inductance. The isolation windings 82a and 84a are connected in series with diodes 80 and 8 connected at each end of the isolation windings. A capacitor 88 is connected between the common terminal of the isolation windings and the common terminal of the diodes. Load 90, is connected in parallel with capacitor 88. Hence, the output circuit provides full wave rectification by using two rectifiers 80 and 86 and a capacitor 88. The output circuit provides the benefits of isolation and voltage conversion, without the requirement of center tapping as is done in output circuits shown in FIG. 3b and FIG. 6. It should be appreciated that the topology of output circuit illustrated in FIG. 8 can be independently utilized in many applications with full-wave rectification and isolation.

As the foregoing demonstrates the present invention offers the significant advantages beyond those supplied by the prior art. Thus in addition to low voltage stress on the switching devices, wide duty cycle range and zero voltage switching at all load conditions, the present invention provides a significant reduction of output ripple as compared to cited prior art.

What is claimed is:

1. A DC to DC converter comprising:
   an input voltage source;
   a capacitance;
   an output circuit;
   a switching circuit for connecting said output circuit alternatively across said voltage source and said capacitance;
   said output circuit further comprising:
   a first inductor and a separate second inductor coupled in series to said switching circuit;
   a third inductor and a separate fourth inductor coupled in series and formed by isolation windings across said first and second, inductor said third and fourth inductors coupled to a first terminal of at least one rectifier at each end for full wave rectification, a second terminal of said rectifiers coupled to a common point, and a capacitance and a load terminal connected across an intermediate point of said third and fourth inductance and said common point.

2. The converter of claim 1, wherein said first and second inductance are substantially equal in value.

3. The converter of claim 2, wherein said third and fourth inductance are substantially equal in value.

4. The converter of claim 3, wherein said switching circuit comprises two electronic switching devices, the first switching device when closed connecting said output circuit across said input voltage source and said second switching device when closed connects said output circuit across said capacitance.

5. The converter of claim 4 wherein said switching circuit switches said two switching devices such that (a) said first switching device is turned on while said second switching device is off; (b) said first switching device is turned off and both said switching devices are off for a short dead-time interval; (c) said second switching device is turned on and said first switching device is off; (d) said second switching device is turned off and both said switching devices are off again for a short dead time interval; and (e) the process is repeated periodically.

6. The converter of claim 5 further comprising capacitance in parallel with at least one of said switching devices, so that voltage across said switching device is virtually zero prior to turning on or off.

7. The converter of claim 6 wherein said capacitance in parallel with said switching devices comprise self-capacitance of said electronic switching devices.

8. A DC to DC converter comprising:
   an input circuit providing a bipolar voltage;
   an output circuit responsive to said bipolar voltage, said output circuit further comprising:
   a first inductor and a separate second inductor coupled in series to form the first and second terminals of said output circuit;
   a third inductor and a separate fourth inductor coupled in series and formed by isolation windings across said first and second inductors, said third and fourth inductors coupled to a first terminal of at least one rectifier at each end for full wave rectification, a second terminal of said rectifiers coupled to a common point, and a capacitance and a load terminal connected across an intermediate point of said third and fourth inductance and said common point.

9. The converter of claim 8 wherein said first and second inductance are substantially equal in value.

10. The converter of claim 9, wherein said third and fourth inductance are substantially equal in value.

11. The converter of claim 10, wherein said inductances have substantially low magnetizing inductance.

* * * * *